United States Patent [19]

Tresser

[11] 4,396,633

[45] Aug. 2, 1983

[54] COMPOSITE ICE CONFECTIONS AND PROCESSES FOR PREPARING THEM

[75] Inventor: David Tresser, Goldington, England

[73] Assignee: Thomas J. Lipton, Inc., Englewood Cliffs, N.J.

[21] Appl. No.: 244,649

[22] PCT Filed: Jul. 21, 1980

[86] PCT No.: PCT/GB80/00119

§ 371 Date: Mar. 20, 1981

§ 102(e) Date: Mar. 17, 1981

[87] PCT Pub. No.: WO81/00189

PCT Pub. Date: Feb. 5, 1981

[30] Foreign Application Priority Data

| Jul. 20, 1979 | [GB] | United Kingdom | 7925375 |
| Jul. 20, 1979 | [GB] | United Kingdom | 7925401 |
| Jul. 20, 1979 | [GB] | United Kingdom | 7925402 |
| Jul. 20, 1979 | [GB] | United Kingdom | 7925447 |

[51] Int. Cl.$^3$ .................. A23G 9/24; A23G 3/00; A23G 1/00; A23G 9/04

[52] U.S. Cl. .................. 426/100; 426/101; 426/565; 426/606; 426/607; 426/306; 426/307

[58] Field of Search ............. 426/100, 101, 565, 606, 426/607, 306, 307

[56] References Cited

U.S. PATENT DOCUMENTS

| 3,099,564 | 7/1963 | Gooding | 426/607 |
| 3,307,953 | 3/1967 | Siebers | 426/607 |
| 3,333,968 | 8/1967 | Bell et al. | 426/101 |
| 4,086,370 | 4/1978 | Olds et al. | 426/101 |

FOREIGN PATENT DOCUMENTS

| 978086 | 1/1962 | United Kingdom . |
| 947672 | 1/1964 | United Kingdom . |
| 1017480 | 1/1966 | United Kingdom . |
| 1102944 | 2/1968 | United Kingdom . |
| 1316079 | 5/1973 | United Kingdom . |
| 1488305 | 10/1977 | United Kingdom . |

*Primary Examiner*—Jeanette M. Hunter
*Attorney, Agent, or Firm*—Brumbaugh, Graves, Donohue & Raymond

[57] ABSTRACT

A composite frozen confection containing a layer of ice confection and a layer or coating of fat based confectionery having suspended therein flavoring and sweetening solids wherein the fat composition has a SCI of:

70-93 at $-20°$ C.
60-93 at $-10°$ C.
55-90 at 0° C.
15-40 at 20° C.
0-12 at 30° C.
0 at 40° C.

A slip melting point in the range of 25°-45° C., and a coating pliability parameter of at least 3. The frozen confection may also include a dry confection such as a wafer wherein the fat based confection separates the ice confection from such dry confection.

30 Claims, No Drawings

COMPOSITE ICE CONFECTIONS AND PROCESSES FOR PREPARING THEM

This invention relates to composite frozen confection products and processes for preparing them: and in particular coated ice confections having fat based coatings (couvertures) and to other composite confections in which ice confections contact a layers of fat-based composition.

Ice confections with fat-based coatings are well-established products. One known coating is chocolate, based on cocoa-butter. Many other fats have been proposed and some used. One fat that has been used is coconut oil.

Fat-based coatings can display properties that are unsatisfactory to the consumer, the producer or both. Such properties include the tendency to break, flake or rub off during production or consumption and to soften too much in the hands.

Another important way in which fat-based coatings can be unsatisfactory is that they may give an unsuitable mouth-feel in the context of the product in which they are used. On the one hand, such coatings may yield a lingering, cloying mouth-feel, seeming to clog the teeth and oral surfaces, often also imparting bitterness to chocolate flavourings. On the other hand, coatings may fail to appear to contain appreciable chocolate flavouring or texture.

One other use of coatings based on fat compositions is in the coating of baked confectionary containers or wafers for ice confections. Fat coating of such baked articles is disclosed for example in GB Pat. No. 947,672 (Big Drum, Inc.). It has been found, however, that with the fat coatings in use there is a problem of loss of crispness in the baked product during storage for a reasonable time, due to water transfer from the adjacent ice confection.

According to the invention there are provided composite frozen confection products having ice confection in contact with a layer of fat-based composition comprising a suspension of flavouring and sweetening solids in an edible fat, preferably for example arranged to separate the ice confection from a dry confection component such as wafer, wherein the edible fat essentially includes a fat composition having:

(a) solids context index (SCI) values (%) (as defined below) in each of the following ranges:
70–93 at $-20°$ C.;
65–93 at $-10°$ C.;
55–90 at 0° C.;
15–40 at 20° C.;
0–12 at 30° C.;
0 at 40° C.;
(b) slip melting point in the range 25°–45° C.;
(c) a viscosity at 40° C. corresponding to measured values (as defined below) as follows:
$\eta_{100} \geq 35$ centipoise; (e.g. $\geq 40$ centipoise;)
$\eta_{CA} \geq 30$ centipoise; (e.g. $\geq 33$ centipoise;) and,
(d) a coating pliability parameter (as defined below) of at least 3.

(In the foregoing and succeeding description reference is made to a number of parameters defined more closely by reference to test methods described hereinbelow.)

Preferably these fat compositions also have SCI values (%) in each of the following ranges:
75–90 at $-20°$ C.;
75–85 at $-10°$ C.;
65–75 at 0° C.

Their preferred slip melting points are in the range 25° to 36° C.

We find that such fats give particularly good results in terms of preventing moisture penetration owing to their lack of excessive brittleness. We also find that they can be formulated into confectionery coating compositions of distinctly good flavour and mouthfeel on their consumption as part of a composite frozen confection. It can also be of advantage if the fat is one that gives a confectionery composition which in the test given below performs with a brittleness time of $\geq 45$ seconds, e.g. $\geq 60$ seconds.

The fats can suitably be such as to show a change in solids content over the last 5° C. of their melting profile of at least 20% of their solids content at $-20°$ C. Their maximum rate of solids formation upon cooling is preferably above 18% per minute, with the time taken to reach 50% solids normally less than 4 minutes. The maximum solids content achieved in $\leq 20$ minutes is normally in the range 70–90%.

Normally we prefer for ice confection use those fats which yield confectionery coatings of the following viscosities at 46° C. when such coatings are formulated using 45% fat content by weight:
$\eta_3 \geq 10$ poise;
$\eta_{100} \geq 2.0$ poise, preferably 2.0–3.6 poise;
$\eta_{CA} \geq 1.2$ poise, preferably 1.4–3.4 poise.

All these parameters are as defined by the test methods noted below on their equivalents.

Fat compositions for use according to the invention can for example comprise triglycerides of which a major or minor proportion by number (but less than $\frac{2}{3}$ by number) are shortchain ($C_{\geq 6}$) acyl groups and of which substantially the complement (more than $\frac{1}{3}$ by number) are long-chain $C_{\geq 12}$ acyl groups. The short and long-chain acyl groups are substantially randomly distributed amongst the triglycerides. This can be achieved (a) by mixing hetergeneous glycerides, i.e. those having both long and short acyl groups, and/or (b) by interesterifying a mixture of unlike glycerides.

Techniques for interesterification, e.g. with sodium methoxide catalyst, are known per se and require no further description herein, though particular manners of carrying out interesterification are shown below.

One very suitable fat composition comprises a mixture of a lauric fat or oil or a non-lauric fat or oil, (optionally hydrogenated either selectively or unselectively to a desired slip melting point, and preferably present at 25–75% by weight) with a short chain acylated (i.e. preferably diacetylated) long chain monoglyceride, preferably present at 75–25% by weight). The long chain acyl groups of the short chain acylated monoglyceride can be derived from any source: $C_{18}$ saturated (stearyl) groups can be used, or optionally shorter chains or unsaturated chains can be present. In particularly preferred embodiments, palm kernel oil and/or cottonseed oil, preferably at about 50% are blended with acetylated $C_{16}$ and/or $C_{18}$ monoglyceride, substantially saturated. A substantially equivalent embodiment can if desired be produced by interesterifying a mixture with corresponding acyl content differently distributed.

"Lauric fat or oil" means an edible oil or fat having lauric and/or myristic acids as substantial fatty acyl constituents, (e.g. constituting 40–50% or more of the acyl groups) with the remaining fatty acyl content containing very little unsaturation: examples are palm kernel oil (preferred), babassu oil, coquito oil, coconut oil (also preferred).

The term "non-lauric fat or oil" means an edible oil in which the principal fatty acyl content is not lauric acid, and for example in which there is a substantial amount of $C_{16}$ and/or $C_{18}$ unsaturated acyl groups, e.g. oleic, linoleic and/or linolenic acyl groups: the remaining bulk of the acyl groups is largely saturated, (e.g. $C_{16}$ and/or $C_{18}$ acids). Examples of such non-lauric oils are cottonseed oil, peanut oil, soyabean oil, sesame oil, safflower oil and sunflower oil, and particularly rapeseed oil (e.g. lowerucic rapeseed oil) and soyabean oil, and also palm oil.

Of course it is understood that in the interesterified blends other sources of acyl groups can be substituted for those quoted and for one another if their proportions and types of acyl groups are sufficiently similar, without regard to their identical triglyceride combination or isomeric analysis. As an example, palm oil can in such compositions be substituted often by lard.

The above-described compositions can be modified in a number of ways. For example, without limitation, the long-chain acyl groups may be derived partly or wholly from fatty compositions which have been made subject to interesterification or other processing, as well as from natural or refined fats and oils. For example, good results have been obtained when the palm kernel oil or cottonseed oil or other lauric or non-lauric fats and oils used as source of long-chain acyl groups are substituted wholly or in part by interesterified blends, e.g. interesterified blends of lauric and non-lauric fats and oils such as palm kernel oil and palm oil, for example in 40-75:60-25 weight proportions, e.g. 60:40. Such a blend can be combined by mixing with, for example, 25-50-75% (of the final fat composition) of diacylated long-chain monoglyceride, e.g. diacetyl $C_{16/18}$ monoglyceride, or by interesterification with a short-chain triglyceride, e.g. triacetin. (Clearly, a single interesterification step will suffice in the latter case.)

Particularly good results have been noted in terms of lack of brittleness where the final composition contains an appreciable portion of a eutectic formed between long-chain triglyceride and a di-(short-chain acyl) mono-)long-chain acyl) glyceride, as is the case with blends of palm kernel oil (25-75%) and diacetyl mono $C_{16/18}$ acyl glyceride (75-25%) and their equivalents.

Slip melting points of the above fat compositions can for example be in the range 24°-42° C.: these and viscosities can be chosen according to the desired method of application of the coatings derived therefrom.

The use of hardened lauric oils gives fats with higher slip melting point than when untreated lauric oils are used. When hardened lauric oils are used, somewhat more short chains can be present than otherwise, since one effect of these is to lower the slip melting point.

Another group of fat compositions suitable for use in this invention comprises an interesterified blend of a lauric fat or oil (e.g. at about 15-45%) with a non-lauric fat or oil (e.g. at about 85-55%). Interesterified blends of palm kernel oil or other lauric fat or oil (30-55%) with palm oil (70-45%) have been found particularly suitable.

Confectionery coating compositions according to this invention comprise a fatty base including one or more of the fat compositions of the types specified above, together with suspended sweetening and flavouring solids, e.g. cocoa powder and sugar; optionally with milk solids and emulsifiers and other additives.

Suitably the fat can constitute e.g. 30-70% of the coating compositions, preferably about 40-60% (e.g. about 50%) where the compositions are to be applied by dipping.

Composite frozen confections according to the invention can comprise layers or zones of such coating compositions together with layers or zones of ice confection and optionally layers or zones of baked or crispy confection, e.g. wafer.

The solid content index, brittleness time, viscosity and coating pliability referred to herein are measurements obtained as described below. The slip melting point is measured by standard procedures well known to those skilled in the field to which this invention relates.

In this specification the solids content index (SCI) refers to a measurement obtained by the following or an equivalent test method: a sample of fat is placed in a low-temperature measurement cell of a wide-line nmr spectrometer calibrated for measurement of sample quantity, such as the "Quantity Analyser" commercially available from Newport Instruments, Newport Pagnell, Buckinghhamshire, England. The sample is held at a required temperature for 10 minutes and then the percent solid fat is obtained from the instrument indication. This result is an SCI(%) referred to the test temperature.

In this specification "the brittleness time" refers to a measurement obtained by the following or an equivalent test method in which what is estimated is the speed at which a confectionery coating composition (containing the fat to be tested) becomes brittle on being used to coat a frozen confectionery article. The fat composition to be tested is incorporated at 59.2% of a confectionery composition containing 25.7% icing sugar, 12.9% cocoa powder (of 10/12% fat content), 1.7% skim milk powder and 0.5% lecithin. The total fat content of the composition should be 60.6%. Any conventional formulation process can be used: desirably the composition is rendered to a final particle size of 17-19 $\mu$m by micrometer screw gauge, with most particles of 14-16 $\mu$m as measured by a Sheen gauge: by Coulter Counter (Trade Mark) measurement 75% of particles are desirably 22 $\mu$m. The confectionery composition prepared this way is melted at 36° for 20 minutes in a gently stirred jacketed vessel, and used to coat frozen ice confection (ice cream) blocks on sticks in the following way. The blocks are desirably of 30 g weight and 100% overrun, stored at −26° C., taken from the store and immersed 9 seconds in moulds surrounded by water at 30° C., so that their surface temperature rises to −5° C. and their interior temperature to −15° C.: the blocks are then immediately dipped into the molten coating composition (immersion for about ½ second), withdrawn, and small sections of the coated block repeatedly cut off with a relatively blunt implement at closely-spaced time intervals by any suitable method until the coating can be heard to give an audible crack on cutting. The purpose is to simulate the conditions under which such compositions and coatings are bitten during consumption, and a test consumer can be used if desired. The time elapsed between the coating immersion and the propensity of the coating to give an audible crack on cutting is taken as the "brittleness time" as referred to in this specification.

In this specification the viscosity measurements $\eta_3$, $\eta_{100}$ and $\eta_{CA}$ are measurements obtained by the following or equivalent test methods. Viscosity measurements can be made on fat compositions or on coating compositions made therefrom. Where a coating composition is characterised, the viscosity measurement is made on the composition itself. Where a fat composition is in question, the viscosity measurements are either made on and referred to the fat composition itself or made on and referred to a coating composition comprising 45% of 59.2% by weight of the fat. Normally, coating compositions of 45% fat are used as standard where the coating compositions are intended for use in enrobing ice confections, and compositions of 59.2% fat where they are intended for use by dipping processes.

The parameters $\eta_3$ and $\eta_{100}$ represent the apparent viscosity at the quoted temperature (e.g. 40° C.) at shear rates of respectively 3 sec$^{-1}$ and 100 sec$^{-1}$. The parameter $\eta_{CA}$ represents the Casson plastic viscosity.

The parameter $\eta_{CA}$ (Casson plastic viscosity) is determined (e.g. using a similar viscometer to that mentioned above), but according to the method of N. Casson (Rheology of Disperse Systems, Pergamon Press, London 1959).

The parameter $\eta_3$ is measured for example using a Deer Rheometer PDR81 (Trade Mark) having an inner rotating cylinder or bob lowered onto a temperature-jacketed outer stationery cylinder containing the sample composition. The inner cylinder or bob is driven at a controlled shear stress and the shear rate induced is measured: the apparent viscosity at a 3 sec$^{-1}$ shear rate is determined from the results obtained at a succession of shear stresses.

The rate of crystallisation of a fat composition sample can conveniently be measured under conditions when the sample (at 32° C.) is placed in an nmr cell of the same wide-line nmr spectrometer at −20° C., and monitoring the signal level from the spectrometer at frequent intervals over about 20 minutes, intercalated with frequent temperature measurements using a temperature probe inserted whenever required into the sample cell, and removed to allow nmr measurement. The maximum rate of solids formation achieved is the Steepest tangent to the curve of solids content versus time obtained from these measurements, and is expressed in % solids per minute.

In this specification the coating pliability refers to a parameter obtained by the following or an equivalent test method. Polythene strips (2.5 cm×6 cm) are immersed in molten, prestirred coating composition or fat under test, to coat an area 25×50 mm. The coating weight is controlled by adjustment of temperature of the molten material to give mean coating film thickness of 0.08–0.1 mm (for fats) and 0.34–0.38 mm (for confectionery coating compositions). Surplus material is drained from the strips and their coatings allowed to harden. Six strips of each coating type are carefully supported at the uncoated end in boxes so that their only point of contact with the inside of the box is at the coated end. The boxes are stored at −15° C. for 24 hours. The coatings are then assessed for pliability (at −15° C.) by exerting gentle steady manual pressure on the strips to bend the ends towards each other. The strips are then given coating pliability ranking values in accordance with their appearance: no imperfections or discontinuities in coating, 5 (very pliable); striations, 4 (pliable); tears (ragged breaks), 3 (some pliability); cracks (one or at most two clean breaks), 2 (brittle); severe cracking (fragmentation or flaking), 1 (very brittle).

The confectionery coating compositions described above containing the above-specified fat compositions can advantageously be sprayed onto ice confection or other confectionery material to be used in conjunction therewith (e.g. a wafer or baked container for ice confection) by means of an atomising spray gun, as in the Example given below by way of illustration only of processes and products according to the invention.

EXAMPLE 1

A fat composition was prepared by blending (in conventional manner) refined palm kernel oil (50% by weight) and a commercially obtainable diacetylated longchain saturated monoglyceride ($C_{16}$ and $C_{18}$) of slip melting point about 44° C. (50% by weight).

This fat composition according to the invention was used in accordance with the invention to make a dark chocolate-flavoured confectionery coating composition containing 50% of the fat composition; 36.5% sugar (sucrose); 13% cocoa powder (12/12% fat content); and the balance a minor amount of flavourant and emulsifier.

The resulting confectionery coating composition was used as described below for spray-coating in the manufacture of composite ice confections and gave good texture combined with excellent processing qualities, and good resistance to permeation of moisture.

Confectionery wafer containers were passed along a conveyor of an apparatus having sequential coating and filling stations.

At the coating station, each container had a 0.5 mm thick layer of chocolate-flavoured fatty coating composition as prepared above applied to its internal surfaces from a downwardly-directed atomising spray gun (from Devilbiss Limited) arranged to deliver a spray of the molten coating (held prior to spraying at 43° C.) into the open top of the container.

After application of the coating, each container was shifted to a filling station where a dose of ice cream or non-dairy ice confection mix at −4° to −5° C. was dosed into the coated container. Finally the composite confection was further frozen and hardened at −26° C. for 30–45 minutes. Its further treatment, additional decoration or further wrapping was conventional and forms no part of this invention. It was found that the product was sufficiently resistant to undesired moisture transport from the ice confection to the wafer as to retain its crispness for some months in frozen storage.

Also usable in the invention are fat compositions comprising interesterified fat blends for making confectionery coating compositions of the kind containing sweetening solids (such as sugar or equivalents) and flavouring solids (such as cocoa powder or other desired flavourants) suspended in a fatty base: such compositions can for example be chocolate-flavoured fatty compositions. According to the invention these can be used to coat ice confections or otherwise in composite products including ice confection portions, e.g. a composite product containing ice confection, fatty confectionery layer or zone, and baked or farinaceous layer or zone.

Also according to this invention we provide fats suitable for confectionery use, which comprise interesterified blends of a lauric fat or oil and a non-lauric oil, optionally selectively hardened.

Techniques for interesterification, e.g. with sodium methoxide catalyst, are known per se, in themselves form no part of this invention, and require no further description, though particular manners of carrying out interesterification are shown below.

"Lauric fat or oil" means an edible oil or fat having lauric and/or myristic acids as substantial fatty acyl constituents, (e.g. constituting 40-50% or more of the acyl groups), with the remaining fatty acyl content containing very little unsaturation: examples are palm kernel oil (preferred), babassu oil coquito oil, coconut oil (also preferred).

The term "non-lauric fat or oil" means an edible oil in which the principal fatty acyl content is not lauric acid, and for example in which there is a substantial amount of $C_{16}$ and/ir $C_{18}$ unsaturated acyl groups, e.g. oleic, linoleic and/or linolenic acyl groups: the remaining bulk of the acyl groups is largely saturated, e.g. $C_{16}$ or $C_{18}$ acids). Examples of such non-lauric oils are cottonseed oil, peanut oil, soyabean oil, sesame oil, safflower oil and sunflower oil, and particularly rapeseed oil (e.g. low-erucic rapeseed oil) and soyabean oil, and also palm oil.

By selective hardening we mean exposure of the fat material to be treated to a catalyst which brings about isomerisation of the ethylenic bonds without substantial hydrogenation: considerable geometrical isomerisation (cis⟵⟶trans) occurs. A suitable known catalyst for the purpose is a poisoned nickel catalyst (a fresh nickel catalyst gives much hydrogenation (unselective hardening) but little of the isomerisation required in selective hardening).

Many of the useful compositions of the invention can, by way of example but not limitation, be made by using e.g. 55-85% of the lauric fat or oil, and e.g. 45-15%, of the non-lauric oil. For example, we have found that many such compositions made with 50-75% lauric fat or oil, e.g. palm kernel oil or coconut oil, and 50-25% non-lauric oil, e.g. palm oil, or rapeseed oil, e.g. low-erucic rapeseed oil, can show particular utility as fatty bases for enrobing confectionery coating compositions (or couvertures). These can be based for example on 30-70%, e.g. 30-55%, e.g. about 45% of the fat, together with sweetening and flavouring agents such as sugar and cocoa powder and optionally milk solids, to give a suspension in the fat of such solid agents. It is understood that such additional ingredients may include further and maybe different fat.

When palm oil is used here as the non-lauric oil its preferred proportions before interesterification are in the range 45%-25% by weight, especially 40%-35% by weight.

A particularly desirable fat in this category comprises a randomly interesterified blend of palm kernel oil (50%-65%) with palm oil (50%-35%), especially in the proportions 60:40. The s.m.p. can be e.g. 25°-32° C., e.g. 26°-30° C.

Many further examples of useful compositions according to the invention can have a major proportion, e.g. up to 85%, or below 90%, of the non-lauric fat or oil in the interesterified blend.

These fat compositions can, for example, be particularly useful in making coatings to be applied to ice confections by dipping.

A particularly desirable fat in this category comprises a randomly interesterified blend of palm kernel oil (PKO) and rapeseed oil (RSO), especially in or about the proportions PKO 82.5:RSO 17.5 by weight: the rapeseed oil is preferably selectively hardened to a slip melting point in a desired range, e.g. about 25°-32° C., such as about 25°-27° C.

When rapeseed oil, e.g. low-erucic rapeseed oil, is used as the non-lauric oil its preferred proportions before interesterification are in the range 50-25-15% by weight; especially about 18% by weight.

Further Examples of suitable fats in this category given for illustration but without limitation are:
(a) an interesterified blend of palm kernel oil and low-erucic rapeseed oil (PKO 60:40 RSO): the rapeseed oil is preferably selectively hardened to a slip melting point in a desired range, e.g. about 27° C.;
(b) an interesterified blend of coconut oil (CNO) and rapeseed oil (CNO 82.5:17.5 RSO): the rapeseed oil is preferably selectively hardened to a slip melting point in a desired range, e.g. about 26° C.

Of course it is understood that in such interesterified blends other sources of acyl groups can be substituted for thos quoted and for one another if their proportions and types of acyl groups are sufficiently similar, without regard to their identical triglyceride combination or isomeric analysis. As an example, palm oil can in such compositions be substituted often by lard.

The invention also provides a confectionery coating composition based on a fat which comprises an interesterified blend of a lauric fat or oil and a non-lauric oil, (for example, with one of the additional features described elsewhere in this specification), and solids suspended in said fat, flavouring agent and optionally milk solids.

Any of the fat compositions described above can be used according to the invention to make confectionery coating compositions comprising a base of the edible interesterified fat (or fatty mixture comprising it) with a suspension therein of solid sweetening and flavouring agents, e.g. sugar and cocoa powder or substitutes therefor. Optionally milk solids, emulsifiers and other additives can be present. The fat content of the coating compositions can, for example, be in the range 30-70% by weight, e.g. about 45-60%.

These coating compositions can be applied to ice confections or to make frozen confection composites according to the invention in any suitable manner, e.g. dipping or enrobing.

The following examples illustrate embodiments of the invention: modifications and variations can of course be made and the examples do not exclude the remaining embodiments of the invention described herein.

EXAMPLE 2

Blends of 60% PKO with 40% palm oil were made from neutralised, fully refined dried oils. 2-2.5 kg batches of the blends were interesterified in a batch process, in a flask fitted with a vigorous stirrer, nitrogen inlet, and temperature control probe. The blends were heated to 110° C. under $N_2$, stirred vigorously and sodium methoxide catalyst (0.2% on the oil) added into the vortex. Stirring was maintained for 30 minutes.

The product was washed with 1% acetic acid solution, followed by water, to remove catalyst and soap, and thoroughly dried. Completion of interesterification was checked by triglyceride GLC analysis.

The dried, interesterified oils were bleached with 2% bleaching earth at 110° C. under nitrogen for 30 minutes. 1% kieselguhr was added to the cooled blends, which were filtered.

650 g batches of the interesterified blends were deodorised for 4 hours at 180° C. under vacuum, and 0.1% of lecithin was added to each deodorised batch, as antioxidant.

Batches of this interesterified blend had a slip melting points of 29.5°–31° C.

The maximum rate (%/minute) of solids formation under the standard test conditions in the batches was 16–23%/minute, with 4–5 minutes required on cooling to reach 50% solid. They had periodate values less than 4, usually 0.5 or less, iodine values of about 31–32, and hydroxyl values about 8–10. The refined oils used in their preparation had FFA contents less than about 0.5 and soap values less than about 0.01.

The percentages solids present at various temperatures were as follows:
 −20° C. 79–85%;
 −10° C. 77–82%;
 0° C. 67–72%;
 10° C. 48–58%;
 20° C. 16–36%;
 25° C. 5–20%;
 30° C. 0–5%;
 35° C. 0%.

Excellent enrobed ice cream bars were prepared by conventional techniques using the products. Processing was easier (shorter setting-up time and less brittle) than with a conventional couverture based on cocoa-butter.

EXAMPLES 3 and 4

(A) Preparation of fat compositions

Crude low-erucic rapeseed oil was neutralised with 0.8 N NaOH. After a water wash, the oil was boiled with 1.5% its weight of 6 N soda ash and 1% by weight of a sodium silicate solution for 30 minutes at 105° C., then washed free of soap and dried. Bleaching was carried out with 1% Tonsil Standard FF (Trade Mark) bleaching compound 20 minutes at 105° C. under vacuum. The neutralised bleached oil was deodorised 30 minutes at 180° C.

The rapeseed oil so treated was blended with fully-refined palm kernel oil in the weight ratio 40 rapeseed oil to 60 palm kernel oil in a first case (Example 2) and 50 to 50 in a second case (Example 3). Batches of the blends were interesterified continuously with 0.05% by weight sodium catalyst at 125° C. for 4 minutes. The product oil was then added to a vessel partly filled with diluted phosphoric acid (to neutralise excess sodium). The treated product oil (interesterified blends) were washed with 0.2 N NaOH and water; when free of soap the blends were dried and filtered over 0.2% Hyflow (Trade Mark) filter aid.

Batches of the blends were selectively hardened under agitation in an autoclave fitted with six-blade turbine stirrer and four baffles. Hydrogen was blown into the headspace of the autoclave. Hardening was carried out at 180° C. with 0.5% by weight of sulphur-poisoned nickel catalyst at 3–5 kg/cm$^2$ H$_2$ pressure. The blends were hardened to slip melting-points of 26.8° C. (Example 2) and 26.7° C. (Example 3). The selectively hardened interesterified blends were neutralised, freed of soap, dried, bleached and deodorised in a similar manner as before. At 60° C., 0.1% fresh lecithin was added to each as antioxidant.

The properties of the fats prepared as described above were found to conform desirably with those described in the above specification as those of the invention.

(B) Preparation of confectionery coating compositions and ice confections

Using normal refining and conching procedures, the fat compositions prepared according to the invention in Examples 2(A) and 3(A) were made up into confectionery coating compositions containing 43.6% of the respective fat, 39.9% sugar, 16% cocoa powder (10/12% fat) and 0.5% lecithin, with optional flavourant to taste. These compositions were found to have highly desirable physical properties when used to coat ice confections (e.g. using an ice-briquette enrober and 40° C. coating temperature) and the flavour and mouthfeel characteristics of the products were found to compare satisfactorily with those of products based on 20% cocoa-butter fat.

EXAMPLE 5

(i) Further interesterified blends of palm kernel oil (PKO) and palm oil (PO) according to the invention were prepared as follows.

A crude blend (60 PKO:40 PO) was made up in a vacuum bleacher, vacuum dried, neutralised with 6 N soda ash, washed and dried. The dried product was bleached at 95°–100° C. for 30 minutes with 1% C300 bleaching earth, filtered and transferred to a clean vessel. There followed interesterification with 0.3–0.4% sodium methoxide catalyst, and the treated blend was washed, vacuum dried, and post-refined with 1% AA bleaching earth at 95°–100° C. for 30 minutes. After filtration and deodorisation 0.1% lecithin was added.

(ii) The interesterified blends produced in Example 4(i) were used to make up confectionery coating compositions according to the invention, which were used to enrobe ice confection briquettes as described in Examples 2 and 3.

The compositions (Examples 4(A), 4(B), 4(C), and 4(D)) were of the following constituents:

|  | 4A | 4B | 4C | 4D |
|---|---|---|---|---|
| Cocoa solids (non-fat) | 14.2% | 16.3% | 5.1% | 5.1% |
| Milk solids (non-fat) | — | — | 18.8% | 18.8% |
| Sugar | 39.9% | 39.0% | 30.6% | 30.6% |
| Lecithin | 0.5% | 0.5% | 0.5% | 0.5% |
| Cocoa butter | 1.8% | 13.2% | 0.7% | 6.5% |
| Butterfat | — | — | 3.5% | 3.9% |
| Interesterified fat blend of Example 4(i) | 43.6% | 31.0% | 40.8% | 34.6% |
| (Total fat content) | (45.4%) | (44.2%) | (45.0%) | (45.0%) |

All showed excellent processing and consumer-appreciable properties. In comparative evaluations, the interesterified blends according to embodiments of this invention were shown to give superior results to otherwise equivalent blends of PKO and PO without interesterification, (such comparative blends lack the physical properties of the fats of this invention specified above). Compositions 4B and 4D had particularly desirable processing and consumer-appreciable characteristics.

EXAMPLE 6

(i) Crude palm kernel oil (FFA = 5.1%) and rapeseed oil (FFA = 3.2%, erucic acid content 37.2) were neutralised separately with 4 N NaOH, and 4 times as much water. The rapeseed oil was further boiled with soda ash and silicate. The oils were washed free of soap and dried. A blend of the refined oils in the proportions palm kernel oil 82.5% and rapeseed oil 17.5% was bleached with 1% Tonsil Standard FF bleaching compound 20 minutes at 105° C. under vacuum. The blend was filtered at 80° C. The filtered bleached product was interesterified continuously with 0.05% by weight sodium methoxide catalyst at 125° C. for 4 minutes and transferred to a neutraliser vessel partly filled with dilute phosphoric acid. After washing with 0.2 N NaOH and water, and after drying, the product was filtered with a commercial filter aid. Two batches of the blend were selectively hardened at 180° C., 3 kg/cm$^2$ H$_2$ pressure, and under strong agitation, with sulphur poisoned nickel catalyst at 0.2% (Example 5(i)A) and 0.5% (Example 5(i)B) respectively. The respective slip melting points achieved after 120 and 150 minutes respective hardening times were 26.8° C. (Example 5(i)A) and 26.6° C. (Example 5(i)B). The hardened blends were neutralised, washed free of soap and dried; then they were bleached, filtered, and doedorised (200° C., 4 hours). After cooling to 60° C., 0.1% by weight fresh lecithin antioxidant was added.

(ii) Confectionery coatings were produced from each fat, using the following ingredients:

| Coating | A | B | C |
| --- | --- | --- | --- |
| Sugar | 25.6% | 20.8% | 15.4% |
| Cocoa powder (12/12% fat) | 12.9% | — | — |
| Cocoa powder (20/22% fat) | — | 10.6% | 7.8% |
| Skim milk powder | 1.7% | — | — |
| Fat Ex. 2(i)A | — | 68.3% | 76.5% |
| Fat Ex. 2(i)B | 59.3% | — | — |
| Emulsifier | 0.5% | 0.3% | 0.3% |
| (Total fat) | (60.7%) | (70.5%) | (78.1%) |

Coatings A and B were used to dip-coat ice cream briquettes/lollipops at 20 strokes per minute on a machine operating at immersion time 0.7 seconds, coating bath temper-ature 36° C., ice cream temperature immediately before dipping (surface) −15° C., (interior) −23° C.

Coating C was used to dip-coat ice cream briquettes/lollipops at 140 strokes/minute using 1.5 seconds immersion time, coating bath temperature 29° C., ice cream surface temperature −9° C., interior temperature −24° C.

In all cases the ice bars weighed about 27 g with 110% overrun. Excellent non-brittle coatings were produced without defects in an extended trial run, while a standard coating based on coconut oil (59.3%) gave by comparison poor coverage, blobs, and caused smearing of some wrappers. Coatings A, B and C gave brittleness times of 64, 85 and 100 seconds by comparison with 32 seconds for the standard coconut oil-based coating. These brittleness times were not directly related to setting times: the fastest coating to set had in fact the longest brittleness time.

The invention is not limited to the use of the materials particularly mentioned above. Further particular examples of useful interesterified fat compositions, e.g. for coatings intended to be sprayed, contain 15–45% of the lauric fat or oil, e.g. interesterified blends of palm kernel oil and cottonseed oil (15%:85%) selectively hardened to slip melting point 25°–29° C.; of palm kernel oil and low-erucic rapeseed oil (15%:85%), selectively hardened to slip melting point 25°–29° C. In each case as in the other cases described above the non-lauric oil can in part or even wholly be substituted by alternative materials, e.g. other non-lauric oils, or tallow olein, or palm olein.

The example compositions described in the above Examples gave good results in terms of easy processability and lack of the usual undesirable degree of brittleness. Such compositions of low brittleness as those described in this specification can advantageously be used to coat a number of edible products where coating flexibility is required at low temperatures. The compositions preferably have a brittleness time (when tested as described below) of at least 45 seconds, e.g. at least 60 seconds or even more than 80 seconds.

According to one aspect of the invention, we use fat compositions comprising triglycerides of which a major or minor portion of the acyl groups (by number) are short chain (C$\leq$6) acyl groups and a major or minor portion of the acyl groups (by number) are long chain (C$\geq$12) acyl groups. In the embodiments described below, the short chain (C$\leq$6) acyl groups form less than 2/3 (by number) of the total acyl groups of the triglycerides. The short and long chain acyl groups are substantially randomly distributed amongst the triglycerides of the fat composition. In the embodiments described below, this random distribution is achieved (a) by mixing of heterogeneous glycerides, i.e. those having dissimilar acyl groups at least at two of the substitution positions of each glyceryl moiety, and/or (b) by interesterification of a mixture of unlike glycerides.

Techniques for interesterification, e.g. with sodium methoxide catalyst, are known per se, in themselves form no part of this invention, and require no further description, though particular manners of carrying out interesterification are shown below.

"Lauric fat or oil" as used in this specification means an edible oil or fat having lauric and/or myristic acids as substantial fatty acyl constituents, (e.g. constituting 40–50% or more of the acyl groups), with the remaining fatty acyl content containing very little unsaturation: examples are palm kernel oil (preferred), babassu oil, coquito oil, coconut oil (also preferred).

The term "non-lauric fat or oil" as used herein means an edible oil in which the principal fatty acyl content is not lauric acid, and for example in which there is a substantial amount of C$_{16}$ and/or C$_{18}$ unsaturated acyl groups, e.g. oleic, linoleic and/or linolenic acyl groups: the remaining bulk of the acyl groups is largely saturated (e.g. C$_{16}$ or C$_{18}$ acids). Examples of such non-lauric oils are cottonseed oil, peanut oil, soyabean oil, sesame oil, safflower oil and sunflower oil, and particularly rapeseed oil (e.g. low-erucic rapeseed oil) and soyabean oil, and also palm oil.

By selective hardening we mean exposure of the fat material to be treated to a catalyst which brings about isomerisation of the ethylenic bonds without substantial hydrogenation: consideration geometrical isomerisation (cis$\longleftrightarrow$trans) occurs. A suitable known catalyst for the purpose is a poisoned nickel catalyst (a fresh nickel catalyst gives much hydrogenation (unselective hardening) but little of the isomerisation required in selective hardening).

The fats preferred of one category of those used according to the invention are triglyceride mixtures comprising a major proportion of acyl groups derived from lauric fats or oils, or non-lauric fats or oils (optionally hydrogenated unselectively or else selectively hardened), and a minor proportion by number of acyl groups with substantially short chain lengths, e.g. up to C$_6$. Preferably all or nearly all the short chain acyl groups are present in mixed triglycerides containing both short and long chains. So, for example, when palm kernel oil is used as a component of the fat, either alone, or in blend with, or in interesterified mixture with another lauric fat or oil or a non-lauric fat or oil, the short chain acyl groups can be introduced by interesterification with for example glyceryl triacetate or glyceryl tributyrate or glyceryl trihexanoate, or they can be introduced by blending (and optional interesterification) with an acetylated long chain monoglyceride or diglyceride, or a long chain mono- or di-glyceride acylated with short chain acyl groups.

Preferably the short chain acyl groups form up to about 20% by number of the total acyl groups of the triglyceride mixture.

Where the short chain acyl groups are acetyl groups, they are preferably present at up to the equivalent of the number of acyl groups that would be provided by 5% by weight triacetin in tripalmitin or a mainly palmitic fat or oil, suitably up to 3% by weight, e.g. 2% by weight. Where the short chain acyl groups are butyryl or hexanoyl groups they are preferably present at up to the equivalent of the number of acyl groups that would be provided by 10% by weight glyceryl trihexanoate in tripalmitin or a mainly palmitic fat or oil, suitably up to 5% by weight.

Suitable examples of fats of this type, given for illustration and not limitation, are:

(a) an interesterified blend of 97% palm kernel oil and 3% triacetin (by weight), which can be selectively hardened to a slip melting point in a suitable range, e.g. about 25.5° C.

(b) an interesterified blend of 90% coconut oil and 10% butterfat. (From this last example it can be seen that a natural source, i.e. in this case butterfat, can be used for the short chain acyl groups, the proportion of the respective material chosen in dependence on its content of such acyl groups.)

The use of hardened lauric oils gives fats with higher slip melting point than when untreated lauric oils are used. When hardened lauric oils are used, somewhat more short chains can be present than otherwise, since one effect of these is to lower the slip melting point.

The preferred fats of this category have been found particularly suitable for the preparation of confectionery coating compositions as illustrated below when the compositions are intended to be applied to a frozen confection by a dipping process (it is emphasised however that the compositions are applicable in other ways too). Further details of the coating compositions and their application are given for example below.

According to the invention, in another aspect, we use fat compositions comprising preferably higher quantities (by number) of the short chain acyl groups compared with those preferred compositions described above. The proportion (by number) of the short chain acyl groups is then preferably less than 2/3 of the total acyl groups.

Fat compositions according to this preferred category can be made by either of the mixture and interesterification methods described above.

One very suitable fat composition comprises a mixture of lauric fat or oil or a non-lauric fat or oil, (optionally hydrogenated either selectively or unselectively to a desired slip melting point, and preferably present at 23-75% by weight) with a short chain acylated (i.e. preferably diacetylated) long chain monoglyceride, preferably present at 75-25% by weight). The long chain acyl groups of the short chain acylated monoglyceride can be derived from any source: $C_{18}$ saturated (stearyl) groups can be used, or optionally shorter chains or unsaturated chains can be present. In particularly preferred embodiments, palm kernel oil and/or cottonseed oil, preferably at about 50% are blended with acetylated $C_{16}$ and/or $C_{18}$ monoglyceride, substantially saturated. A substantially equivalent embodiment can if desired be produced by interesterifying a mixture with corresponding acyl content differently distributed.

The preferred fats of this category have been found particularly suitable for the preparation of confectionery coating compositions as illustrated below when the compositions are intended to be used in frozen confection manufacture by spraying or injection. (It is emphasised however that the compositions are applicable in other ways too). Further details of the coating compositions and their application are given for example below.

Slip melting points of the fat compositions can for example be in the range 24°-42° C.: these viscosities can be chosen according to the desired method of application of the coatings derived therefrom.

Confectionery coating compositions according to this invention comprise a fatty base including one or more of the fat compositions of the types specified above, together with suspended sweetening and flavouring solids, e.g. cocoa powder and sugar, optionally with milk solids and emulsifiers and other additives. Suitably the fat can constitute e.g. 30-70% of the coating compositions, preferably about 40-60% (e.g. about 50%) where the compositions are intended to be sprayed and about 50-70% (e.g. about 60%) where the compositions are to be applied by dipping.

Composite frozen confections according to the invention can comprise layers or zones of such coating compositions together with layers or zones of ice confection and optionally layers or zones of baked or crispy confection, e.g. wafer.

Described below, for example only, are embodiments of the invention selected from amongst the categories of processes and products according to the invention.

EXAMPLE 7

(i) Refined palm kernel oil and commercial food-grade triacetin were blended in the ratios of 97:3 respectively. A batch of the blend was interesterified in a vessel fitted with a powerful stirrer, $N_2$ inlet and temperature control, by heating to 110° C. under $N_2$, agitation and injection of 0.2% by weight sodium catalyst. A colour change indicated completion of the reaction: agitation was maintained for 30 minutes. The product was washed with 1% acetic acid solution, followed by water washing to remove catalyst and soap, then dried. Completion of interesterification was checked by GLC of the triglycerides.

The product was given a slight selective hardening over sulphur-poisoned nickel catalyst to a slip melting-point of 25.5° C. Postrefining was carried out by bleaching with 2% C300 bleaching earth at 110° C. under $N_2$ for 30 minutes. 1% of kieselguhr was added to the cooled product and the whole filtered. After deodorisation (180° C. under vacuum for 4 hours) and addition of 0.1% lecithin the product interesterified blend was made up into confectionery coating compositions.

(ii) A couverture composition intended especially but not exclusively for the dip-coating of ice confections was made up with the following ingredients: fat blend prepared in Example 1(i) 59.3%; sugar 25.6%; cocoa powder (10/12% fat content) 12.9%; skimmed milk powder 1.7%; emulsifier 0.5%; optional flavour to taste.

Ice confection briquettes were coated in similar manner to that described in the description of the test for brittleness time given below. The resulting products were made with excellent processing and consumer characteristics and showed a brittleness time of about 75 seconds.

The above-described embodiments and others of the compositions of the invention can be modified in a number of ways. For example, without limitation, the long-chain acyl groups may be dreived partly or wholly from fatty compositions which have been made subject to interesterification or other processing, as well as from natural or refined fats and oils. For example, good results have been obtained when the palm kernel oil or cottonseed oil or other lauric or non-lauric fats and oils used as source of long-chain acyl groups are substituted wholly or in part by interesterified blends, e.g. interesterified blends of lauric and non-lauric fats and oils such as palm kernel oil and palm oil, for example in 40-75:60-25 weight proportions, e.g. 60:40. Such a blend can be combined by mixing with, for example, 25-50-75% (of the final fat composition) of diacylated long-chain monoglyceride, e.g. diacetyl $C_{16/18}$ monoglyceride, or by interesterification with a short-chain triglyceride, e.g. triacetin. (Clearly, a single interesterification step will suffice in the latter case.)

Particularly good results have been noted in terms of lack of brittleness where the final composition contains an appreciable portion of a eutectic formed between long-chain triglyceride and a di-(short-chain acyl) mono-(long-chain acyl)glyceride, as is the case with blends of palm kernel oil (25–75%) and diacetyl mono $C_{16/18}$ acyl blyceride (75–25%) and their equivalents.

The example compositions described in the above Examples gave good results in terms of easy processability and lack of the usual undesirable degree of brittleness. Such compositions of low brittleness as those described in this specification can advantageously be used to coat a number of edible products where coating flexibility is required at low temperatures.

Further examples of the compositions have a fatty base comprising or consisting substantially of a selectively or unselectively hardened edible oil or fat. In particular embodiments the hardened edible oil or fat can be, for example (e.g. selectively) hardened butter fat or butter oil (or butterfat stearin), or an (e.g. selectively) hardened edible non-lauric oil The term "non-lauric fat or oil" means an edible oil in which the principal fatty acyl content is not lauric acid, and for example in which there is a substantial amount of $C_{16}$ and/or $C_{18}$ unsaturated acyl groups, e.g. oleic, linoleic and/or linolenic acyl groups: the remaining bulk of the acyl groups is largely saturated, (e.g. $C_{16}$ and/or $C_{18}$ acids). Examples of such non-lauric oils are cottonseed oil, peanut oil, soyabean oil, sesame oil, safflower oil and sunflower oil, and particularly rapeseed oil (e.g. low-erucic rapeseed oil) and soyabean oil, and also palm oil.

Particularly suitable for the purposes of the invention are (e.g. low-erucic) rapeseed oil, groundnut or soyabean oil.

By selective hardening we mean exposure of the fat material to be treated to a catalyst which brings about isomerisation of the ethylenic bonds without substantial hydrogenation: considerable geometrical isomerisation (cis⇌trans) occurs. A suitable known catalyst for the purpose is a poisoned nickel catalyst (a fresh nickel catalyst gives much hydrogenation (unselective hardening) but little of the isomerisation required in selective hardening).

The selective (or unselective) hardening can be carried out to the point at which the fat has a convenient slip melting point, e.g. 27°–34° C., though higher and lower melting points may be usable in some circumstances, e.g. 24°–42° C., 25°–40° C. The hardened oil or fat can form 100% of the fat of the confection, for example, or if desired somewhat less, e.g. 80–90% or 95%, if desired.

It is found that such fat coatings and zones for frozen confections can give good pliability and impermeability to moisture at low temperatures, thus enabling the production of frozen confections including baked or crisp components with desirably long shelf-lives at low temperatures.

The confectionary coating compositions can for example be made up with a fat content of 30–70% by weight, e.g. about 45% fat, 35–45% sugar, and 12–16% cocoa powder (e.g. 10/12% fat content cocoa powder). The presence of other fats besides those specified above is not excluded. Optional further additives include for example milk solids, emulsifiers and flavourants.

In the production processes according to the invention the fat coatings and zones can conveniently be applied by spraying, e.g. from an atomising spray gun. Illustrative embodiments of the products and processes of the invention are given below by way of example only.

EXAMPLE 8

A confectionery coating composition was made up using the following constituents:

Hardened butterfat—45%
Cocoa powder (10/12)—16.3%
Sugar—38.7%
Flavouring—trace

The hardened butterfat for the composition had been made as follows:

Butterfat was neutralised with 10% of 0.2 N caustic soda, washed free of soap and bleached with 0.3% Tonsil Standard FF and 0.2% of filter aid at 105° C.

The resulting oil was hardened at 180° C. with 0.23% nickel as GK/s catalyst (sulphur-poisoned nickel), at 3 bar hydrogen pressure for about one hour, until a slip melting point increase of 1° C. had been achieved. (The process may be followed by measurement of refractive index, when the $ND^{65}$ changed by about 0.001 during the course of the reaction).

Post-refining was performed with a 10% 0.1 N caustic soda wash until the product was soap-free, bleaching as in the pretreatment, and finally a deodorisation for five hours at 180° C. 0.1% fresh lecithin was added as antioxidant. The product had slip melting point 33°–34° C.

Confectionery wafer containers were passed along a conveyor of an apparatus having sequential coating and filling stations.

At the coating station, each container had a 0.5 mm thick layer of chocolate-flavoured fatty coating composition as prepared above applied to its internal surfaces from a downwardly-directed atomising spray gun (from Devilbiss Limited) arranged to deliver a spray of the molten coating (held prior to spraying at 43° C.) into the open top of the container.

After application of the coating, each container was shifted to a filling station where a dose of ice-cream or non-dairy ice confection mix at −4° C. to −5° C. was dosed into the coated container. Finally the composite confection was further frozen and hardened at −26° C. for 30–45 minutes. Its further treatment, additional decoration or further wrapping was conventional and forms no part of this invention. It was found that the product of this Example could be stored for a satisfactorily long time without unacceptable moistening of the wafer by water from the ice-cream or non-dairy ice.

EXAMPLES 9–11

Example 8 was repeated except for the composition of the fatty confectionery coating. For the coating composition in each Example, the following edible oils were selectively hardened in a similar way to that described above, and to the following slip melting points:
  Example 9—groundnut oil—s.m.p. 27° C.
  Example 10—soyabean oil—s.m.p. 39° C.
  Example 11—low-erucic rapeseed oil—s.m.p. 31° C.

The resulting hardened oils were incorporated and treated in an otherwise similar way to Example 8, and the resulting confections had good storage life together with satisfactory textural and flavour characteristics on consumption.

I claim:

1. A composite frozen confection comprising an ice confection in contact with a layer of fat based confectionery composition comprising a suspension of flavoring and sweetening solids in a fat base wherein the fat base includes a fat composition having:
   (a) solids content index (SCI) values (%) in each of the following ranges:
     70–93 at −20° C.
     60–93 at −10° C.
     55–90 at 0° C.
     15–40 at 20° C.
     0–12 at 30° C.
     0 at 40° C.
   (b) slip melting point in the range 25°–45° C.;
   (c) viscosity measured at 40° C. corresponding to $\eta 100$ at least 35 centipoise, and $\eta CA$ at least 30 centipoise; and
   (d) a coating pliability parameter of at least 3.

2. A composite frozen confection according to claim 1, wherein the fat base comprises a fat composition essentially consisting of triglycerides in which less than ⅔ by number of the acyl groups are short-chain ($C \geq 6$) acyl groups and more than ⅓ by number of the acyl groups are long chain ($C \geq 12$) acyl groups, substantially randomly distributed amongst the triglycerides.

3. A composite frozen confection according to claim 2 wherein the fat composition is selected from the group consisting of blends of 25%–75% aluric fat, non-lauric fat or oil with 75%–25% short-chain diacylated long chain monoglyceride, interesterified blends of lauric or non-lauric fat or oil with up to about 10% short-chain trigylceride.

4. A composite frozen confection according to claim 1, wherein the fat base comprises a fat composition selected from the group consisting of hardened buffer fat, hardened low-erucic rapeseed oil, hardened groundnut oil and hardened soyabean oil, each having a slip melting point in the range of about 27°–34° C.

5. A composite frozen confection according to claim 1, wherein the fat base comprises an interesterified blend of lauric fat or oil with a non-lauric oil other than palm oil.

6. A composite frozen confection as described in claim 1 wherein the layer of fat based confectionery serves to separate the ice confection from a dry edible confection.

7. A composite frozen confection as described in claim 6 wherein the solids content index at −20° C. is 75–90.

8. A composite frozen confection as described in claim 6 wherein the solids content index at −10° C. is 75–85.

9. A composite frozen confection as described in claim 6 wherein the solids content index at 0° C. is 55–90.

10. A composite frozen confection as described in claim 1 wherein the slip melting point is in the range of 25°–36° C.

11. A composite frozen confection as described in claim 1 wherein the viscosity corresponding to $\eta 100$ is 40 centipoise.

12. A composite frozen confection as described in claim 1 wherein the viscosity corresponding to $\eta CA$ is 33 centipoise.

13. A composite frozen confection according to claim 2 wherein the blends contain about 50% of the aluric fat, non-lauric fat or oil with about 50% shortchain diacylated long chain monoglyceride.

14. A composite frozen confection according to claim 4 wherein the fat composition has a slip melting point above about 31° C.

15. A composite frozen confection according to claim 5 wherein about 15–45% by weight of lauric fat or oil is combined with about 85–55% by weight of a nonlauric oil other than palm oil.

16. A composite frozen confection according to claim 5 wherein about 15–55% by weight of a lauric fat or oil is combined with about 85–45% by weight palm oil.

17. A process for producing a frozen confection which comprises contacting an ice confection with a layer of fat based confectionery composition comprising a suspension of flavoring and sweetening solids in a fat base wherein the fat base includes a fat composition having:
   (a) solids content index (SCI) values (%) in each of the following ranges:
     70–93 at −20° C.
     60–93 at −10° C.
     55–90 at 0° C.
     15–40 at 20° C.
     0–12 at 30° C.
     0 at 40° C.
   (b) slip melting point in the range 25°–45° C.;
   (c) viscosity measured at 40° C. corresponding to $\eta 100$ at least 35 centipoise, and $\eta CA$ at least 30 centipoise; and
   (d) a coating pliability parameter of at least 3.

18. A process as described in claim 17 wherein the layer of fat based confectionary serves to separate the ice confection from a dry edible confection.

19. A process as described in claim 18 wherein the solids content index at −20° C. is 75–90.

20. A process as described in claim 18 wherein the solids content index at −10° C. is 75–85.

21. A process as described in claim 18 wherein the solids content index at 0° C. is 55–90.

22. A process as described in claim 17 wherein the slip melting point is in the range of 25°–36° C.

23. A process as described in claim 17 wherein the viscosity corresponding to η100 is 40 centipoise.

24. A process as described in claim 17 wherein the viscosity corresponding to ηCA is 33 centipoise.

25. A process as described in claim 17 wherein the fat base comprises a fat composition essentially consisting of triglycerides in which less than ⅔ by number of the acyl groups are short-chain (C≧6) acyl groups and more than ⅓ by number of the acyl groups are long chain (C≧12) acyl groups, substantially randomly distributed amongst the triglycerides.

26. A process as described in claim 17 wherein the fat composition is selected from the group consisting of blends of 25%–75% aluric fat, non-lauric fat or oil with 75%–25% short-chain diacylated long chain monoglyceride, interesterified blends of lauric or nonlauric fat or oil with up to about 10% short-chain triglyceride.

27. A process as described in claim 17 wherein the fat base comprises a fat composition selected from the group consisting of hardened butter fat, hardened lower-erucic rapeseed oil, hardened groundnut oil and hardened soyabean oil, each having a slip melting point in the range of about 27°–34° C.

28. A process as described in claim 17 wherein the fat base comprises an interesterified blend of lauric fat or oil with a non-lauric oil other than palm oil.

29. A process as described in claim 28 wherein about 15–45% by weight of lauric fat or oil is combined with about 85–55% by weight of a nonlauric oil other than palm oil.

30. A process as described in claim 28 wherein about 15–55% by weight of a lauric fat or oil is combined with about 85–45% by weight palm oil.

* * * * *